United States Patent Office 3,506,474
Patented Apr. 14, 1970

3,506,474
WRINKLE COATING COMPOSITIONS COMPRISING PARTICULATE THERMOPLASTIC RESIN DISPERSED THEREIN AND METHODS
Theodore A. Neuhaus, Lakewood, and Andrew Marcis, Cleveland, Ohio, assignors to SCM Corporation, Cleveland, Ohio, a corporation of New York
No Drawing. Filed July 17, 1968, Ser. No. 745,419
Int. Cl. C09d 3/66, 3/76, 5/28
U.S. Cl. 117—41
11 Claims

ABSTRACT OF THE DISCLOSURE

Methods and compositions for consistently forming deep, distinctive wrinkle finish coatings are disclosed. A small amount of a solid particulate thermoplastic resin is incorporated into normally wrinkling coating compositions to serve as nucleation sites or "seeds" for the development of wrinkle patterns, when the coating is applied to and cured on a substrate.

---

This invention relates to wrinkle coating compositions. More particularly, this invention pertains to the nucleation and formation of more pronounced and distinctive wrinkle patterns in normally wrinkling coating compositions.

Wrinkle finishes have been used for a great many years as decorative, protective coatings for a wide variety of substrates, including metal, plastic, glass, ceramic, wood, paper, concrete block, tile and the like. Specific applications include coatings on typewriters, adding machines, file cabinets, fishing tackle boxes and tool boxes.

In coating a substrate with a rugose or wrinkle-textured film, it is important that there be developed a considerable degree of contractive or expansive strain between the film and the substrate while the film is curing. This contraction or expansion differential between the coating layer and the substrate manifests itself in the form of a decorative wrinkle pattern as the coating is cured and polymerized. Apparently, wrinkle pattern networks develop about and between polymerization nuclei at the substrate-coating interface as the curing of the coating progresses. Accordingly, the formation of polymerization nucleation sites is an important factor in controlling the rapid formation of consistent wrinkle patterns in each application. In the past, these nucleation sites have not been controlled and have been random surface impurities, irregularities or defects on the substrate surface.

The present invention provides methods and compositions for developing rugose coating films by controlling the formation of nucleation sites at the film-substrate interface which results in the formation of consistently deep and distinctive wrinkle patterns in each application. Additionally, the present invention provides a one coat, tough, hard, durable finish which hides scratches and other substrate defects and can be applied by conventional methods including spraying, brushing, dipping, knife-spreading and roller-coating.

According to the present invention, solid particles of a thermoplastic resin such as polyvinyl chloride, polypropylene and the like, are dispersed throughout a conventional, normally wrinkling coating composition containing a film-forming resinous vehicle, in an amount sufficient to nucleate the development of deeper wrinkle patterns than are normally formed when the particular coating composition is applied to, and dried on a substrate. Additionally, the wrinkle patterns form more rapidly when the particulate thermoplastic resin is present.

In practicing the present invention, particulate thermoplastic resins are employed which retain particulate form under the thermal conditions prevalent during the curing of the coating. Suitable thermoplastic resins are those which may soften but do not melt at the thermal conditions employed in curing the coating. By this is meant that the thermoplastic particles may soften to the extent that surface irregularities such as sharp edges tend to smooth over without softening to the extent that the particulate form is lost through melting.

The choice of thermoplastic resin, then, depends on the curing characteristics of the normally wrinkling coating composition with which the thermoplastic resin is to be used. For many normally wrinkling coating compositions, vinyl resins such as vinyl chloride, vinyl acetate, vinyl chloride-acetate copolymers, vinylidene chloride, polystyrene, styrene - acrylonitrile, acrylonitrile - butadiene-styrene (ABS), acrylic resins, and polyolefins such as polyethylene and polypropylene. The polyolefins (particularly polypropylene) are usually used in the interest of efficiency and economy.

It has been found that the thermoplastic resin content of about 0.1% by weight of the coating composition is sufficient to produce a noticable improvement in the wrinkle depth as well as the rate of pattern development. Usually, the proportion of particulate thermoplastic resin is about 0.1% to about 3% by weight of the coating composition in the interest of economic practicality, although proportions of 5% by weight and higher can be employed.

The coating compositions of the persent invention comprise then, a normally wrinkling film-forming, resinous vehicle and a particulate thermoplastic resin, together with conventional additives such as driers, pigments and fillers, in a solvent dispersion.

The solid particulate thermoplastic provides nucleation sites for the wrinkle pattern formation and deeper, more pronounced wrinkle patterns are developed in normally wrinkling compositions than are attainable in the absence of such particles.

The film-forming resinous vehicles employed in the present coating compositions can be any of those known in the art. Some of the more common resins that can be employed include various gum resins such as congo, East India, kauri, and cumar; as well as the synthetic alkyd and phenol-formaldehyde resins.

Of these resins, unsaturated alkyd resins comprising unsaturated polyesters prepared from aliphatic dibasic acids and anhydrides such as maleic acid, maleic anhydride, fumaric acid, phthalic acid and phthalic anhydrides and mixtures thereof; and polyhydric alcohols such as pentaerythritol, trimethylolethane, trimethylolpropane, ethylene glycol, propylene glycol, and glycerol; and modified with drying oils such as dehydrated castor oil, tung oil, linseed oil, soybean oil, tall oil esters, sunflower oil, safflower oil, perilla, oiticica and walnut oil; have attained wide acceptance in wrinkling coating compositions. These alkyds can be further modified with other materials such as rosin, styrene, phenolic resins and silicones to achieve specific wrinkling characteristics.

The unsaturated polyester components of the alkyd resin film-forming vehicle described above are of a thermosetting type and polymerize with the unsaturated drying oils upon curing. To promote cross-linking and curing of the unsaturated polyesters, polymerizable vinyl monomers such as styrene and vinyl toluene can also be present. Styrene and vinyl toluene are commonly employed monomers because they readily cure to form tough, highly cross-linked coatings.

The driers utilized in the present coating composition are conventional and are usually metallic driers including the oxides, linoleate and naphthenate compounds such as manganese oxide, lead oxide, cobalt linoleate, cobalt naphthenate, manganese naphthenate and the like.

Solvents and thinners can also be used in the present compositions to afford a diluting or dispersing medium for the other ingredients so that the compoistion can be handled and applied to a surface in a thin film. Toluol, xylol, naphtha, and mineral spirits are commonly employed solvents.

Standard paint pigments such as carbon, iron oxide, titanium dioxide and the like can be employed in the present composition to produce various colors and shades in finished coatings.

In practicing the present invention, thermoplastic solid particles are incorporated into the coating composition described above with sufficient mixing to provide a stable physical blend. The particle size is usually in the range of about 30 microns and smaller to about 300 microns and larger depending on the depth and texture of the wrinkle pattern desired, although it has been found that a particle size of about 100–200 microns provides distinctive and decorative wrinkle textures for many applications.

While the exact chemical or physical mechanism of the present invention is not presently understood, it is strongly suspected that the individual particles function as nucleation sites or "seeds" at the substrate coating interface and throughout the coating layer. When the coating is cured, film irregularities are formed about these nucleation sites and the expansion differential between the curing coating and the substrate causes wrinkle patterns to be formed about the particles. Accordingly, smaller particles (i.e., about 30 microns to about 100 microns) result in less pronounced wrinkle patterns while the larger particles result in deeper, more distinctive wrinkle textures.

The following examples show how the invention can be practiced but should not be construed as limiting. All parts are parts by weight, and all percentages are weight percentages unless otherwise specified.

EXAMPLE 1

An alkyd resin solution (hereinafter referred to as resin solution A) was prepared by reacting 768 parts of phthalic anhydride, 335 parts of glycerine, 20 parts of ethylene glycol, 1,640 parts of tung oil, and 1,280 parts of conventionl phenol-formaldehyde resin at about 450° F. for 2–3 hours. The resulting alkyd resin was diluted with 4,000 parts of toluol.

A second alkyd resin solution (hereinafter referred to as resin solution B) was prepared by reacting 2,424 parts of linseed oil, 2,424 parts of tung oil, 2,609 parts of glycerine, and 4,894 parts of phthalic anhydride in 4,300 parts of a medium boiling range, aromatic solvent (Shell solvent TS–28) at 350° F. to 400° F. for about 2 hours. The resulting resin was diluted into a solvent mixture of 1,500 parts of xylol and 5,800 parts of toluol.

The resulting resin solution B was clear and bright in appearance and had an acid number of 30–35.

A brown-colored wrinkled coating composition was prepared by mixing together 70 parts of resin solution A, 8 parts of resin solution B, 8 parts of styrene monomer, 2 parts of butyl alcohol (solvent), 1 part of manganese naphthenate (drier), and 1 part of solid, particulate polypropylene polymer having an average particle size of about 150 microns. To this coating composition was added 2.2 parts of lampblack, 2 parts of red iron oxide, 2 parts of yellow iron oxide and 4 parts of titanium dioxide as pigments. The resulting mixture was stirred in an agitated reactor until a stable mixture was formed.

A portion of this coating composition was then sprayed on a clean steel substrate at room temperature, and cured at 300° F. for 15 minutes. At the end of this cure period, an attractive, tough, abrasion resistant, tenaciously adherent coating was formed on the steel substrate. The coating had deep, pronounced and distinctive wrinkle patterns thereon. It was observed that the polypropylene particles had not completely melted into the coating, but had been enveloped in the coating layer in particulate form, serving as wrinkle nucleation sites.

To determine if the polypropylene would melt or soften at the curing conditions employed, a few grams of the particulate polypropylene were maintained at 350° F. for 15 minutes. At the end of this period, the polypropylene was still in particulate form and had not noticeably melted.

During the curing it was observed that the wrinkling pattern developed in about 3 or 4 minutes.

EXAMPLE 2

As a control on the presence of polypropylene, a coating compoistion similar to that prepared in Example 1 was prepared without the particulate polypropylene. The resulting mixture was applied to a steel substrate by spraying as in Example 1 and was cured at 300° F. for 15 minutes. At the end of this period, a rugose finish had developed, but the wrinkle pattern was shallower, less distinctive, and much less pronounced than in Example 1. Additionally, about 10 minutes were required for the wrinkle pattern to develop on curing.

From the foregoing, it is apparent that a novel method and composition for producing distinctive nucleated wrinkle patterns has been discovered and developed.

Having thus described the invention, what is claimed is:

1. In the method for forming a wrinkle pattern coating film on a substrate wherein a normally wrinkling coating composition including a normally wrinkling film-forming resinous vehicle is applied to and cured on said substrate at a temperature and for a time sufficient to develop a wrinkle pattern coating film thereon, the improvement which comprises:

utilizing sufficient dispersed particulate thermoplastic resin in said normally wrinkling coating composition to enhance the nucleation and development of deep textured wrinkle patterns when said coating composition is cured at a temperature and for a time so that said thermoplastic resin maintains particulate form.

2. The method of claim 1 wherein said particulate thermoplastic resin has a particle size of at least about 30 microns.

3. The method of claim 1 wherein said particulate thermoplastic resin is present in the proportion of about 0.1% to about 5% by weight of said coating composition.

4. The method of claim 2 wherein said particulate thermoplastic resin is a polyolefin polymer.

5. The method of claim 4 wherein said film-forming resinous vehicle is an alkyd resin.

6. The method of claim 5 wherein said polyolefin is polypropylene.

7. The method of claim 6 wherein said polypropylene has a particle size in the range of about 100 microns to about 200 microns, and is present in the proportion of about 0.1% to about 3% of said coating composition.

8. In the method for forming a wrinkle pattern coating on a substrate wherein a normally wrinkling drying oil-modified alkyd resinous vehicle, together with driers and pigments in a coating composition, is applied to and cured on said substrate at a temperature and for a time sufficient to develop a wrinkle pattern coating thereon, the improvement which comprises:

utilizing sufficient dispersed particulate polypropylene in said coating composition to enhance the nucleation and development of deep textured wrinkle patterns when said coating composition is cured at a temperature and for a time such that said polypropylene maintains particulate form.

9. The method of claim 8 wherein said particulate polypropylene has a particle size of about 150 microns and is present in the proportion of about 1% by weight of said coating composition.

10. An article having a wrinkled coating film thereon formed by the process of claim 2.

11. An article having a wrinkled coating film thereon formed by the process of claim 9.

References Cited

UNITED STATES PATENTS

| | | | |
|---|---|---|---|
| 2,671,063 | 3/1954 | Waldie | 260—22 |
| 2,982,670 | 5/1961 | Jeff | 117—41 |
| 3,023,122 | 2/1962 | De Pataky | 117—38 |
| 3,097,105 | 7/1963 | Edmonds | 117—41 |
| 3,338,857 | 8/1967 | Shur et al. | 117—41 |

OTHER REFERENCES

Organic Finishing, November 1955, volume 16, No. 11, pages 6 and 8–12.

DONALD E. CZAJA, Primary Examiner

R. W. GRIFFIN, Assistant Examiner

U.S. Cl. X.R.

117—132, 161; 260—20, 22, 23, 26, 27, 33.4, 33.6, 38, 40, 41